United States Patent [19]

Rogers

[11] 4,360,705
[45] Nov. 23, 1982

[54] PANEL RACEWAY SYSTEM CORNER FITTING

[75] Inventor: Wilfred R. Rogers, Bristol, Conn.
[73] Assignee: The Wiremold Company, West Hartford, Conn.
[21] Appl. No.: 272,052
[22] Filed: Jun. 9, 1981
[51] Int. Cl.³ .............................................. H02G 3/00
[52] U.S. Cl. ...................................... 174/48; 160/127
[58] Field of Search .................... 174/48, 49; 160/127, 160/135, 351; 52/220, 221, 173 R, 239; 339/22 R, 23

[56] References Cited

U.S. PATENT DOCUMENTS

| 4,133,153 | 1/1979 | Hage ........................................ 52/220 |
| 4,270,020 | 5/1981 | Kenworthy et al. ................... 174/48 |
| 4,278,834 | 7/1981 | Boundy ................................. 174/48 |

Primary Examiner—A. T. Grimley
Assistant Examiner—D. A. Tone
Attorney, Agent, or Firm—Hayes & Reinsmith

[57] ABSTRACT

A customized raceway system is disclosed which is designed to be surface mounted along the bottom of a structural panel for quick and easy installation and concealment of telephone and electrical wiring. The raceway system features a corner fitting for interconnecting a pair of raceways and accommodating different panel layout configurations minimizing time and effort of installation by virtue of an open sided construction and selectively removable tabs longitudinally extending along three side edges of rectangular plates of the corner fitting for establishing continuity between isolated raceway communication and power compartments.

13 Claims, 15 Drawing Figures

PANEL RACEWAY SYSTEM CORNER FITTING

BACKGROUND OF THE INVENTION

In open space partitioning, electrical raceways have been found to be particularly adaptable to channel telephone communication and electrical power to selected locations when mounted on the bottom of structural panels. Difficulties, however, have been encountered in interconnecting the raceways in a simplified manner when joining such panels and their raceways, particularly at corners wherein the panels are to be joined at right angles. Spaces are created between panels by panel connecting elements and such spaces must be accommodated if the finished installation is to be aesthetically pleasing as well as to maintain the integrity of communication and power wiring compartments in isolated relation as normally required by building codes.

The corner fitting of this invention is designed for facile installation to interconnect adjacent raceways and also to support a corner panel post between the panels on which such raceways are mounted. An upstream panel normally has a connector on which the corner panel post is supported; the corner panel post normally has a connector on which the downstream panel is supported. The connector on the corner panel post creates a space between the corner panel post and downstream panel.

The corner fitting of this invention additionally is designed to accommodate that spacing created between panels by the panel connecting means.

SUMMARY OF THE INVENTION

This invention features a corner fitting for a panel raceway system and which is particularly designed as a basic constructional unit adapted to accommodate and interconnect a variety of different structural panel layouts. The fitting itself serves to interconnect and provide continuity between communication and power wiring compartments of raceways which are mounted on the bottom of adjacent structural panels in a particularly unique fashion to provide a customized fit between panels with minimal effort of installation. The corner fitting itself has a plurality of generally rectangular horizontally extending plates with removable space-filling tabs longitudinally extending along three corresponding side edges of each plate, the plates being generally aligned respectively with horizontally extending walls of the raceways which walls define in part the raceway wiring compartments. The remaining side of each plate has an edge, devoid of any tab, dimensioned to correspond to terminal end edges of the horizontally extending walls of the raceways. The side edges of the plates which are devoid of tabs and designed to abut an upstream panel raceway. Any side edge of a plate which is not aligned with a downstream adjoining panel is modified to remove its tab. Accordingly, one or more tabs are retained for connection to one or more aligned downstream panel raceways (1) to fill the space, created by a panel mounting connector member of a corner panel post, between the corner panel post and a downstream panel or panels, (2) to assist in supporting that panel mounting connector member and corner panel post and (3) to maintain continuity and isolated integrity of the raceway wiring compartments at the juncture of adjoining structural panels.

A better understanding of the objects, advantages, features, properties and relations of the invention will be obtained from the following detailed description and accompanying drawings which set forth a certain illustrative embodiment and is indicative of the way in which the principle of the invention is employed.

DETAILED DESCRIPTION

Figure 7:
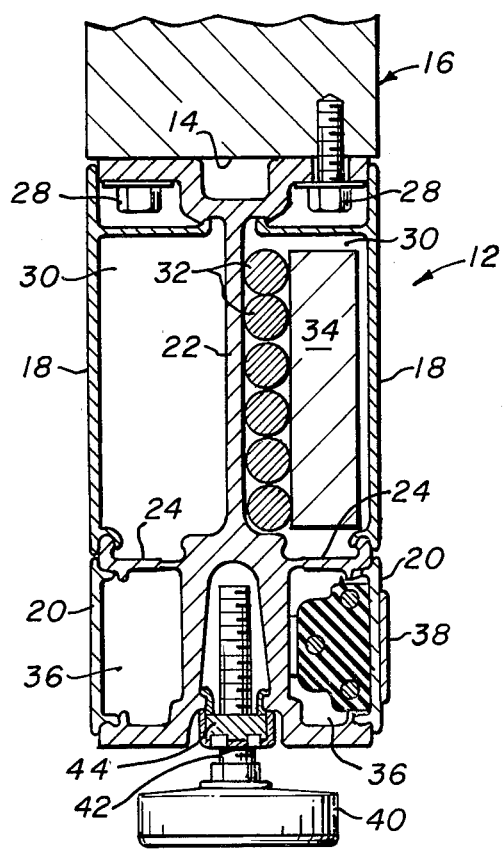
FIG. 7 is a cross sectional view, partly broken away, showing a raceway mounted on the bottom of a panel and which is suited for use with the corner fitting of this invention.
Figure 6:
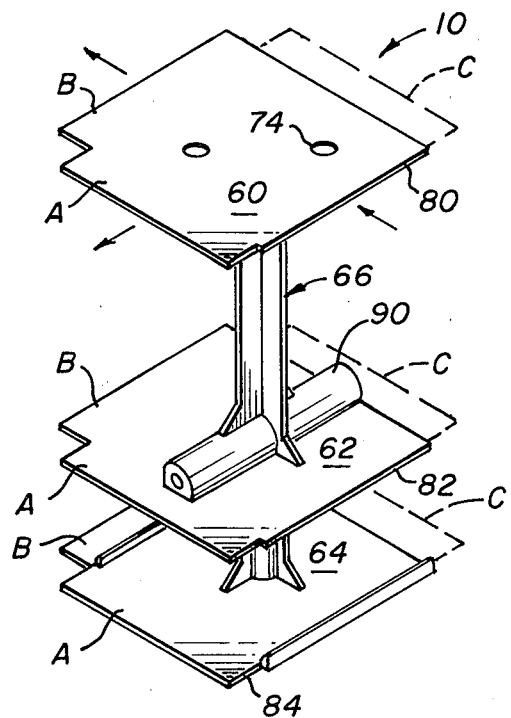
Figure 8:
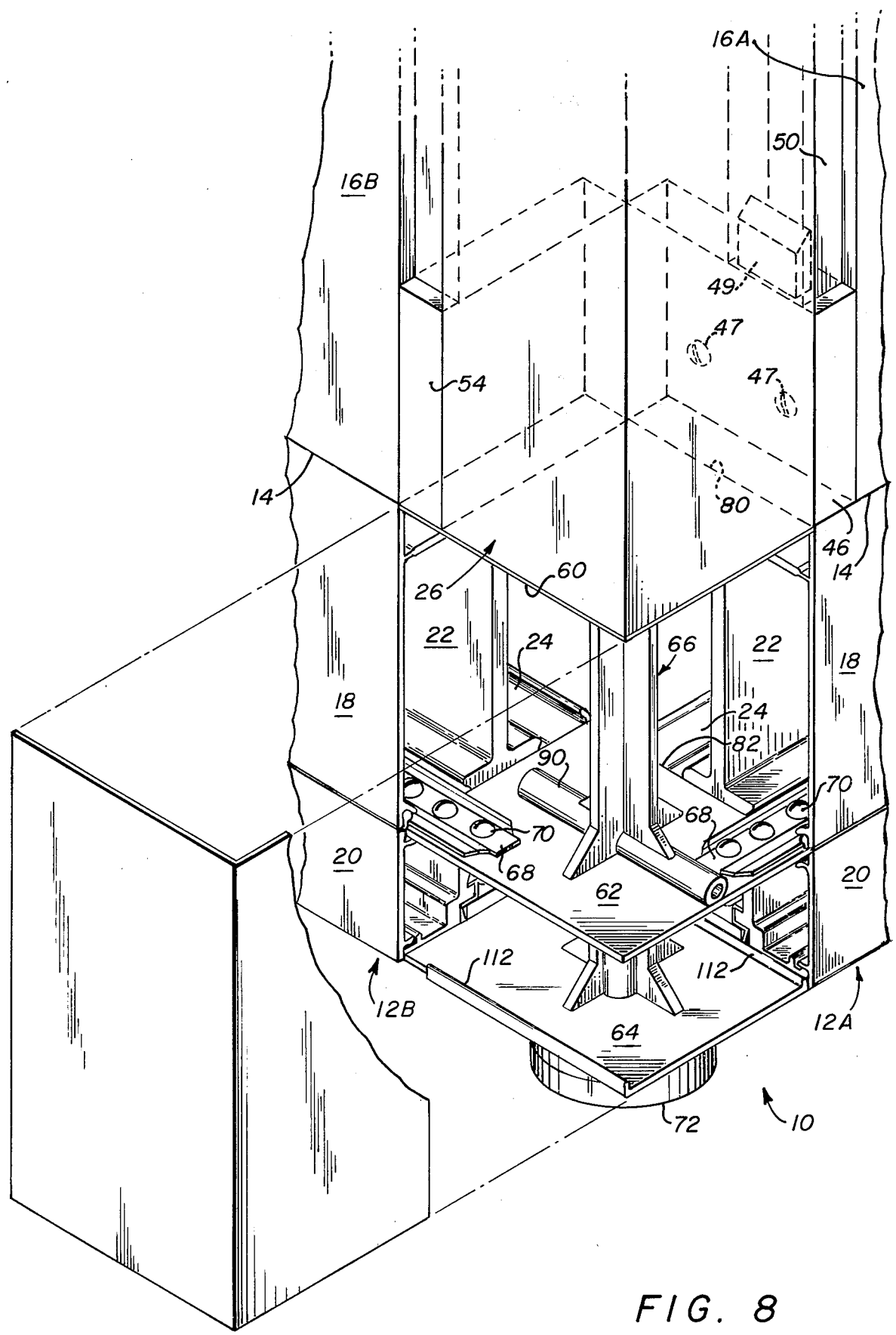
FIG. 8 is an isometric view, partly exploded and partly broken away, showing certain components of a panel raceway system incorporated in this invention.

Referring now in detail to the several figures of the drawings, a corner fitting 10 of this invention is illustrated in FIGS. 1-6 and which is particularly suited for use in connection with a panel raceway system 12, shown in FIGS. 7 and 8. The panel raceway system 12 is designed to fit directly under the bottom 14 of a partition or structural panel 16 (FIG. 7) of a type which may be incorporated in an open plan office system. The raceway system is the means by which telephone wiring and electrical power is channeled to office workstations.

As shown in FIG. 7, a pair of snap-on raceway covers 18, 20 are mounted on each side of the raceway 12 flush with side wall surfaces of the panel 16. The covers 18, 20 are preferably designed to be snap-fit into engagement with a web 22 and intermediate horizontally extending shelves 24 of the raceway 12. Referring to FIG. 8, an upstream panel is designated 16A having an underlying raceway 12A; a corner panel post 26 is illustrated in overlying relation to a supporting corner fitting 10; and a downstream panel is designated 16B having an underlying raceway 12B. Each raceway web 22 is secured by suitable fasteners such as the screws 28 illustrated in FIG. 7 to the bottom 14 of the panel 16, and each side of the raceway 12 is divided into two isolated wiring compartments respectively closed and concealed by removable covers 18, 20. An upper compartment 30 is illustrated as housing a plurality of cables 32 and connector 34 for telephone wiring. A lower electrical wiring compartment 36 will be understood to have a suitable wiring harness for supplying electrical power with an outlet being depicted at 38. It will be understood that suitable telephone communication entrance fittings and power entrance fittings, not shown, are provided for the respective compartments 30, 36. An adjustable glide 40 is illustrated as having an upwardly extending fastener 42 threadably engaged in a fixed nut 44 which may be selectively positioned longitudinally of the base of the raceway web 22 in fixed relation to fastener 42 for selectively adjusting the height of the raceway 12 and its associated panel 16.

Any suitable means may be used to connect corner panel post 26 to the adjoining upstream and downstream structural panels 16A and 16B (FIG. 8). In the illustrated embodiment, a panel latch or panel mounting connector member 46 is shown fixed by screws 47 to upstream panel 16A, with the base of latch 46 flush with raceway 12A. A tang 49 is integrally mounted on an upper face of latch 46 for receipt within a hollow locking tube 50 fixed to upstream panel 16A. While not shown, a second locking tube is preferably mounted on corner panel post 26 in adjacent parallel relation to the illustrated tube 50 on upstream panel 16A for locking engagement with a tang, not shown, (which will be understood to be similar to tang 49) fixed on an opposite upper end of upstream panel 16A. Each side of corner panel post 26 which is to be connected to a downstream panel will be understood to have a tang and locking tube arrangement similar to that described between the upstream panel 16A and corner panel post 26 for suspending a downstream panel such as at 16B on post 26. In the specifically illustrated embodiment in FIG. 8, a second panel connector 54 is illustrated between the corner panel post 26 and the downstream panel 16B. This second panel connector 54 is integral with the corner panel post 26 and a tang and tube arrangement similar to those illustrated at 49 and 50, will be understood to be installed on corner panel post 26 for engaging a complementary tube and tang on the adjacent confronting end of downstream panel 16B for supporting panel 16B in fixed assembly with the corner panel post 26 and its upstream panel 16A.

Because of the variety of different partition requirements for panel layout configurations encountered in various open plan office systems, problems have been consistently encountered in providing inventories of a variety of corner fittings for the different layout configurations. Moreover, the flexibility of the various open plan office systems has also resulted in considerable time and effort expended in providing the desired layout installations in customized applications.

In the corner fitting 10 of this invention, a significantly improved and simplified approach is featured wherein an open side construction is disclosed for maximum flexibility regardless of the panel and raceway corner layout configuration or location while, at the same time, being particularly suited for integrating a lay-in electrical wiring and communication wiring approach in a flush mounted electrical raceway system.

More specifically, the corner fitting 10 of this invention is cast as a common part from suitable material such as aluminum. To accommodate a variety of different panel layout configurations, three removable tabs A, B, C are provided on each of three horizontally extending plates 60, 62 and 64 which are supported on a common post 66 with the plates 60 and 64 being maintained in spaced parallel relation to one another and comprising the upper ceiling and lower floor respectively for the respective wiring compartments 30 and 36 at each corner between adjoining panel raceways such as at 12A and 12B. An intermediate plate 62 is shown supported on the corner post 66 and disposed in a plane parallel to the upper and lower plates 60, 64 of the fitting 10 and generally aligned with the intermediate shelves 24, 24 of the raceway web 22 separating the upper communications compartment 30 from the lower electrical wiring compartment 36 with the intermediate plate providing the floor and ceiling respectively of the upper and lower wiring compartments 30, 36 at the corner fitting 10 interconnecting the raceways 12A, 12B. The plates 60, 62 and 64 of the corner fitting 10 are all substantially the same size and configuration. In the specifically illustrated embodiment shown in FIG. 8, a continuity coupling 68 is shown secured by screw fasteners 70 between the intermediate plate 62 of the corner fitting 10 and adjoining shelves 24, 24 of the upstream and downstream raceways 12A, 12B, and a suitable glide 72 is illustrated as being provided on the bottom of the corner fitting 10. It will be understood that glide 72 is of a type similar to glide 40 illustrated in FIG. 7 and may be threadably connected to the corner fitting 10 for selectively adjusting the height of the corner panel post 26 and supporting corner fitting 10 upon securing the same with suitable fasteners, not shown, such as screws which may be driven through openings 74 in the upper plate 60.

As previously noted, the disclosed corner fitting 10 is preferably cast as a common part to accommodate different panel layout configurations by the provision of three selectively removable space-filling tabs on three corresponding side edges of each corner fitting plate 60, 62 and 64. Each tab A, B and C may be selectively eliminated, as desired, by a secondary machining operation during installation. The tabs serve as a space filler to make up the thickness of the panel connectors such as at 54 between the panels 26 and 16B to be joined and also serve to support that panel connector 54.

In the illustrated corner fitting 10 of this invention as seen in FIG. 8, the upstream panel 16A and its integral panel connector 46 will lie flush on the upstream raceway 12A and will abut the corner fitting 10 at the side edge 80 of its upper plate 60 which is devoid of a space-filling tab as are the corresponding underlying side edges 82 and 84 of the intermediate and lower plates 62 and 64 adjacent the upstream raceway 12A. As previously described, the corner panel post 26 is supported on the upstream panel connector 46. The corner panel post 26 itself has a connector or connectors for coupling any adjoining downstream panel which requires support. The disclosed tab or tabs featured on the corner fitting of this invention not only provide that support but additionally fill the space occupied by the panel connector, such as at 54 in FIG. 8, in each of the interconnecting corner wiring compartments defined by the corner fitting and further ensure continuity of flush raceway mounting in an aesthetically pleasing, customized installation which is quick and easy to install.

By virtue of the above described construction, each projecting side edge of each plate 60, 62 and 64 is provided with a longitudinally extending tab along the sides of each plate except for that side such as at 80, 82 and 84 which serves as the edge engaged in abutment with the incoming or upstream raceway. The tabs at each side of each of the plates are identical and, to accommodate the panel connectors such as at 54 as previously described, the depth and width of the tabs are each preferably dimensioned and configured to correspond substantially to the thickness and width of the panel connector to be supported, it being understood that each tab width likewise corresponds to but is slightly less than the distance between the raceway side walls as defined by their covers.

Figure 5:
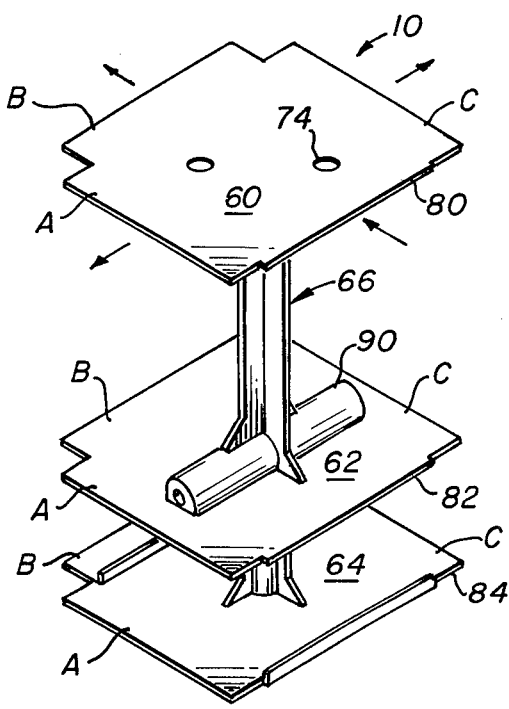
Figure 14:
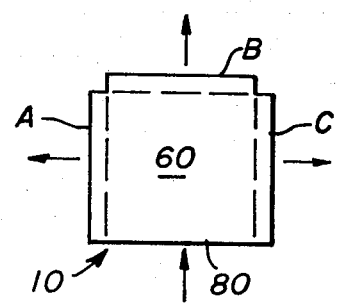

As seen in FIGS. 5 and 14, the side edges 80, 82 and 84 of plates 60, 62 and 64 will be understood to be engageable with an upstream raceway such as at 12A in FIG. 8, and each such side edge 80, 82 and 84 is substantially aligned with adjacent terminal edges of tabs A and C. A squared cutout is shown between tab B on each corner fitting plate 60, 62, 64 and its adjoining tabs A and C, whereby tab B on plates 60, 62, 64 is disposed in symmetrical relation to side edge 80, 82, 84, respectively, and to each of the adjacent tabs A and C to ensure mating raceway abutment within the confines of the raceway side walls.

As described, the side of the corner fitting which is to be installed in abutting engagement with the upstream raceway is the only edge on each of the corner fitting plates which is not provided with a removable tab. The intermediate plate 62 on each corner fitting 10 is designed to be assembled in direct abutting engagement with the shelves 24, 24 extending laterally from the raceway web 22, and reinforcing strengthening ribs such as at 90 are preferably provided on each intermediate plate 62 which provides at each panel raceway corner a continuity and isolation of upper and lower wiring compartments 30, 36 with the corner fitting post 66 being disposed within the confines of each plate 60, 62, 64 in spaced apart, unobstructing relation to its side edges for maximum flexibility or selectivity in orienting the corner fitting in different relative positions in relation to the panels and their underlying raceways.

During installation, the tabs A, B, C are retained on only those sides of the corner fitting 10 which are to be connected to an adjoining downstream panel and its underlying raceway. For clarity of illustration, arrows are shown in FIGS. 1-6 and 9-14 for assistance in identifying the upstream and downstream relationship of raceways to be connected via fitting 10 in a variety of different applications.

Figure 4:
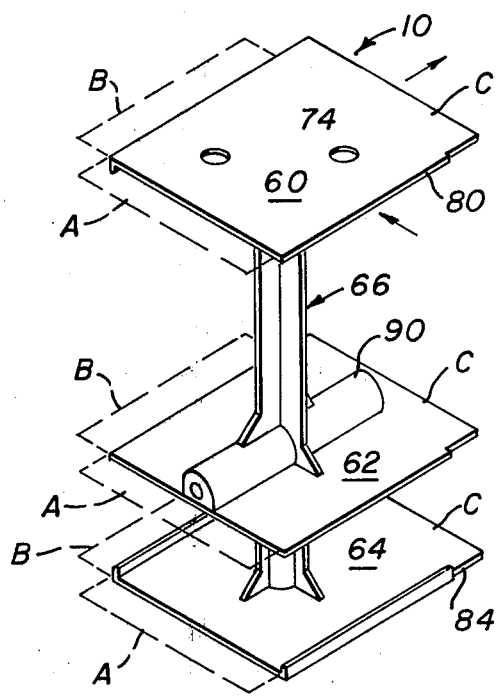
Figure 9:
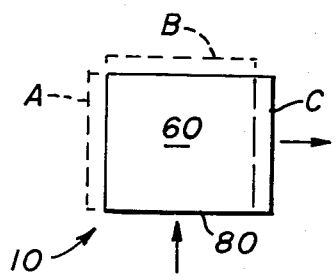
FIGS. 9-14 are schematic views of different applications of the corner fitting of this invention for use with different panel raceway layouts.
Figure 15:
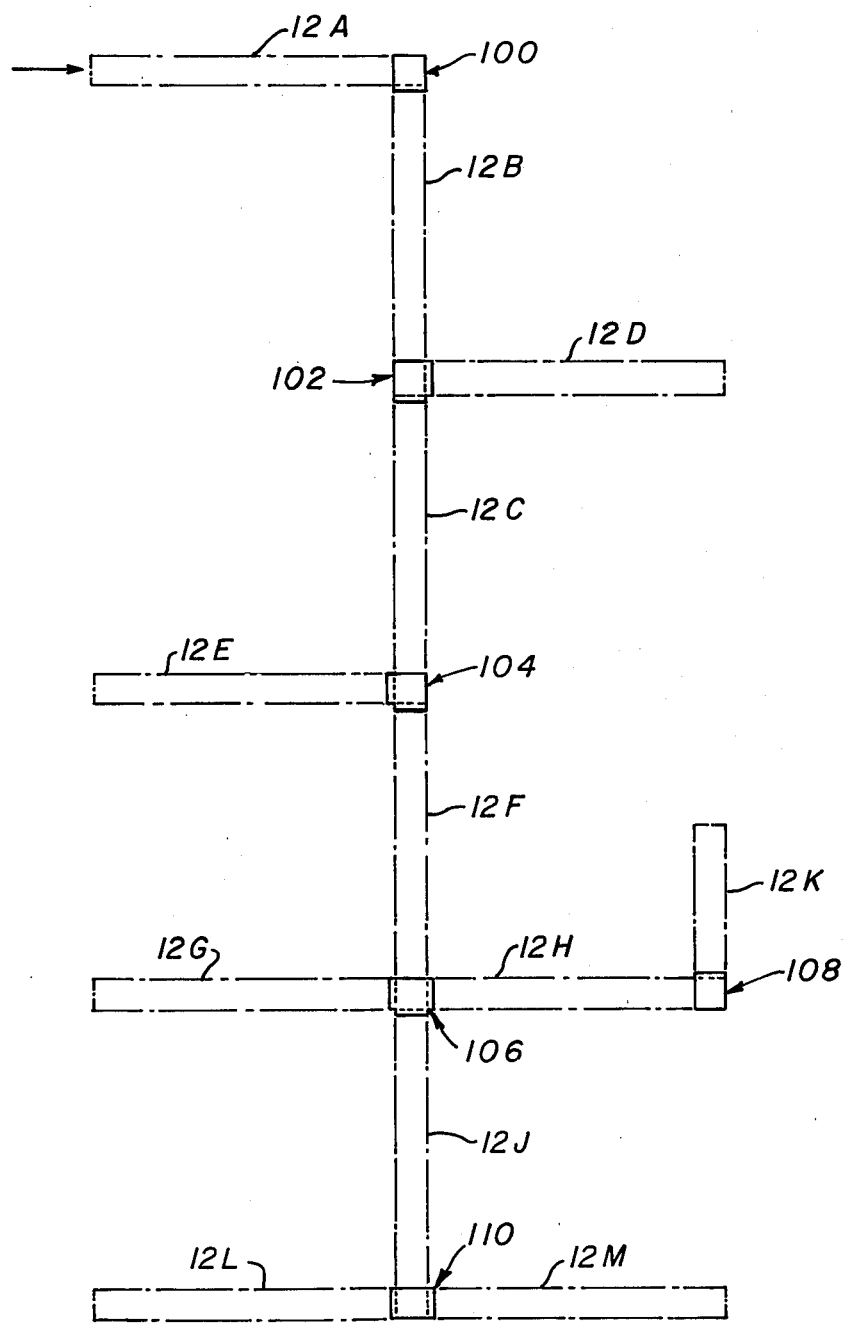
FIG. 15 is a schematic plan view showing a structural panel layout and illustrating different panel layout configurations which the corner fitting of this invention is adapted to accommodate.

The corner fitting of FIG. 8 is also shown in FIGS. 4 and 9 and is referred to as a right-hand 90° corner fitting as referenced from an upstream raceway (arrow incoming to fitting 10) relative to a downstream raceway, e.g., in the direction of the outgoing arrow in FIGS. 4 and 9. In FIG. 15, a right-hand 90° corner fitting 100 has tabs designated A and B (FIGS. 4 and 9) on each of its plates 60, 62, 64 removed with their tabs C being retained to fill a space corresponding to the panel connector (such as 54 in FIG. 8 which is supported on the upper plate 60 of the corner fitting 10 between the corner panel post 26 and the downstream panel 16B) to provide the desired continuity and integrity of the defined upper and lower wiring compartments 30, 36 below corner panel post 26 between raceways 12A and 12B.

Likewise, a left-hand "T" corner fitting is depicted at 102 in FIG. 15 wherein tabs C (FIGS. 6 and 10) are removed from each of the respective plates of the corner fitting providing a pass-through to aligned downstream raceway 12C and a 90° left-hand connection to downstream raceway 12D. A so-called right-hand "T" corner fitting is illustrated at 104 in FIG. 15 and shown more clearly at FIGS. 3 and 13 wherein all tabs A are removed to permit suitable connection of a panel raceway 12E perpendicular to and to the right of the upstream panel raceway 12C as well as a pass-through to an aligned downstream raceway 12F.

Figure 1:
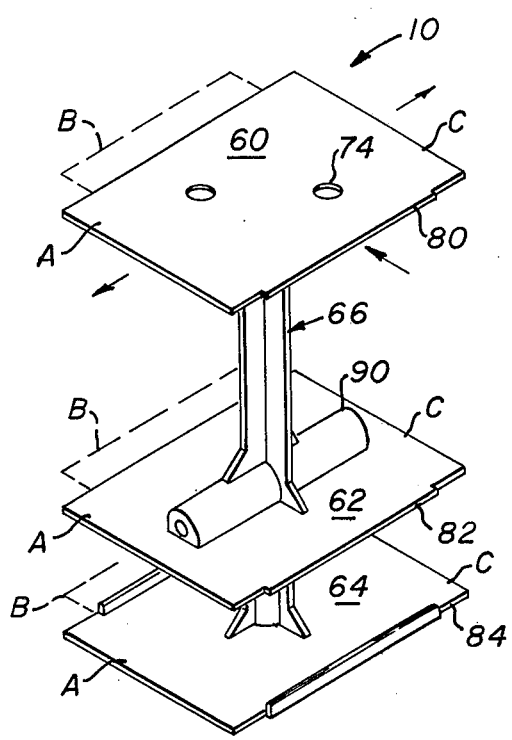
FIGS. 1-6 are isometric views showing a corner fitting of this invention adapted for different structural panel raceway layout configurations.
Figure 3:
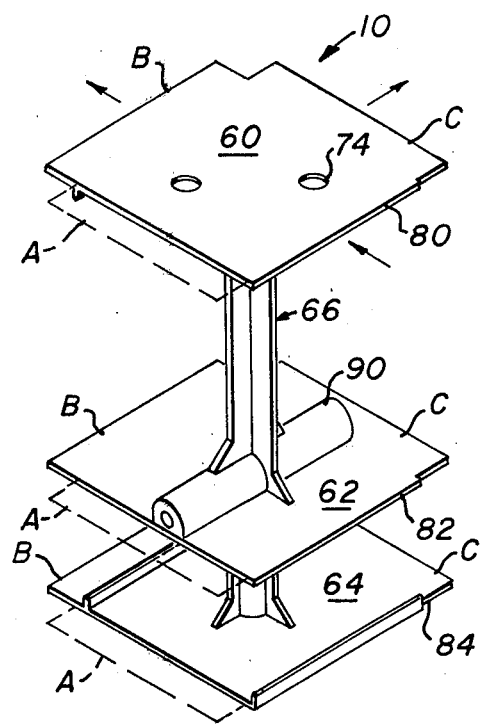
Figure 2:
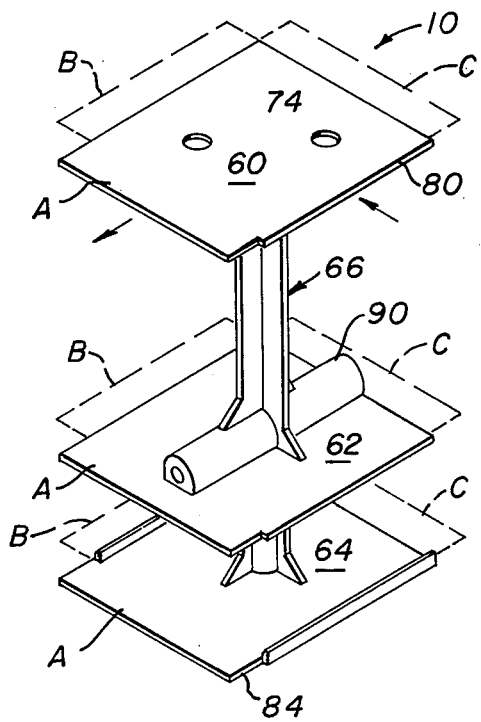
Figure 12:
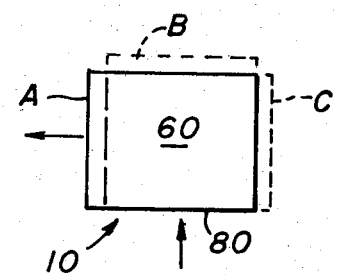
Figure 10:
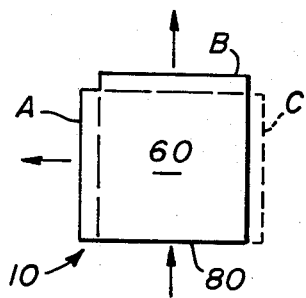
Figure 13:
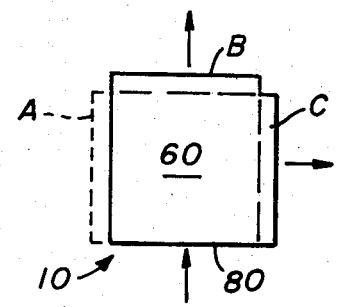
Figure 11:
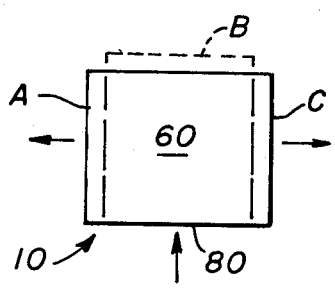

In FIGS. 5 and 14, a so-called "cross-through" corner fitting is depicted wherein all tabs A, B and C are retained for use in connecting, as an example, upstream raceway 12F (FIG. 15) through "cross-through" fitting 106 to downstream laterally extending raceways 12G and 12H, in perpendicular relationship to upstream raceway 12F, and also to an aligned downstream raceway 12J. Raceway 12H is shown in FIG. 15 also connected to a downstream raceway 12K by means of a left-hand 90° corner fitting 108 (such as shown in FIGS. 2 and 12). Finally, raceway 12J in FIG. 15 is shown terminating in laterally extending perpendicular downstream raceways 12L and 12M via an interconnecting right-hand and left-hand "T" corner fitting 110 (FIGS. 1 and 11) wherein all tabs B on the corner fitting plates will be understood to be removed with tabs A and C respectively serving to provide the above described support and space accommodation required by the left-hand and right-hand downstream panels and their raceways.

By virtue of the above described construction, each of the corner fittings upon installation are readily provided with a suitably configured cover which is preferably of a type similar to the raceway covers 18, 20 shown in FIG. 7 of a snap-in type engageable with lips such as at 112 (FIG. 8) and which serve to house and conceal the wiring compartments in an aesthetically pleasing customized manner.

As will be apparent to persons skilled in the art, various modifications, adaptations and variations of the foregoing specific disclosure can be made without departing from the teachings of this invention.

I claim:

1. A panel wiring system comprising a pair of raceways having corresponding generally rectangular cross-sectional configurations including upper, lower and side walls, mounted in underlying relation to upstream and downstream panels joined by connecting means, including a corner panel post,
    a corner fitting in underlying relation to the corner panel post for interconnecting the pair of raceways,
    the corner fitting including upper and lower plates and an upright post integrally connecting the plates,
    the upper and lower plates respectively being generally aligned with upper and lower walls of the raceways, and
    the corner fitting post being disposed within the confines of each plate in spaced unobstructing relation to its side edges for selectively orienting the corner fitting in relation to different positions of the panels and their respective underlying raceways.

2. The system of claim 1 further including a floor engageable glide mounted on the corner fitting for selectively adjusting the height of the corner fitting in relation to the adjoining raceways.

3. The system of claim 1 wherein the raceways each include a shelf intermediate the upper and lower raceway walls and extending between the raceway side walls,
    the shelf, upper wall and side walls of each raceway defining an upper wiring compartment,
    the shelf, lower wall and side walls of each raceway defining a lower wiring compartment in isolated relation to the upper wiring compartment, and
    wherein the corner fitting includes an intermediate plate generally aligned with the shelf of each adjoining raceway,
    each of the plates of the corner fitting extending in spaced parallel relation to one another.

4. The system of claim 3 wherein each of the plates are in surrounding relation to the upright corner fitting post with the corner fitting post being in spaced unobstructing relation to side edges of the each of the plates.

5. The system of claim 1 further including coupling means for securing the corner fitting to the adjoining raceways.

6. The system of claim 1 wherein the upper plate of the corner fitting is secured in underlying supporting engagement with the corner panel post.

7. The system of claim 1 or claim 3 wherein the upstream and downstream panels are joined by the corner panel post and connecting means, including a panel mounting connector member fixed to the corner panel post and having a predetermined width and thickness, and wherein the plates of the corner fitting are of substantially identical rectangular configuration and size with selectively removable tabs on three corresponding edges, the removable tabs each being of a width and depth respectively corresponding to the width and thickness of the panel mounting connector member.

8. A panel wiring system comprising a pair of raceways having corresponding generally rectangular cross-sectional configurations including upper, lower and side walls, mounted in underlying relation to upstream and downstream panels joined by a corner panel post and connecting means, including a panel mounting connector member fixed to the corner panel post and having a predetermined width and thickness, a corner fitting in underlying relation to the corner panel post for interconnecting the pair of raceways, the corner fitting including upper and lower plates interconnected in fixed relation to one another and respectively generally aligned with upper and lower walls of the adjoining raceways, the corner fitting plates each being of substantially identical rectangular configuration and size with selectively removable tabs on three corresponding edges, the tabs each being dimensioned in depth corresponding to the thickness of the panel mounting connector member.

9. The system of claim 8 wherein each side edge of each corner fitting plate, upon removal of each of their respective removable tabs, is dimensioned to correspond substantially to the distance between the side walls of each raceway.

10. The system of claim 9 wherein the corner fitting additionally includes a cover removably secured thereto in flush relation to the adjoining raceways.

11. The system of claim 8 wherein the raceways each include a shelf intermediate the upper and lower raceway walls and extending between the raceway side walls, the shelf, upper wall and side walls of each raceway defining an upper wiring compartment, the shelf, lower wall and side walls of each raceway defining a lower wiring compartment in isolated relation to the upper wiring compartment, and wherein the corner fitting includes an intermediate plate generally aligned with the shelf of each adjoining raceway, and wherein each of the plates of the corner fitting extend in spaced parallel relation to one another.

12. The system of claim 8 or claim 11 wherein the width of each of the removable tabs is approximately equal to the distance between the side walls of the raceways.

13. The system of claim 8 or claim 11 further including an upright post supporting each of the plates, the plates each being in surrounding relation to the corner fitting post and in spaced parallel relation to one another.

* * * * *